US010862583B2

(12) United States Patent
Ryan (10) Patent No.: US 10,862,583 B2
(45) Date of Patent: Dec. 8, 2020

(54) NODE WITH COMBINED OPTICAL AND ELECTRICAL SWITCHING

(71) Applicant: Western Digital Technologies, Inc., San Jose, CA (US)

(72) Inventor: Robert P. Ryan, Mission Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/728,897

(22) Filed: Dec. 27, 2019

(65) Prior Publication Data

US 2020/0145099 A1    May 7, 2020

Related U.S. Application Data

(63) Continuation of application No. 16/024,723, filed on Jun. 29, 2018, now Pat. No. 10,560,765.

(Continued)

(51) Int. Cl.
  *H04B 10/27*    (2013.01)
  *H04B 10/079*   (2013.01)
  (Continued)

(52) U.S. Cl.
  CPC ....... *H04B 10/079* (2013.01); *H04B 10/0793* (2013.01); *H04B 10/27* (2013.01);
  (Continued)

(58) Field of Classification Search
  CPC ....... H04B 10/079; H04B 10/27; H04B 10/29
  See application file for complete search history.

(56) References Cited

U.S. PATENT DOCUMENTS

| 6,192,167 B1 | 2/2001 | Kissa et al. |
| 10,284,291 B1 | 5/2019 | Ryan |

(Continued)

FOREIGN PATENT DOCUMENTS

WO    2012177769 A1    12/2012

OTHER PUBLICATIONS

Calient; Calient Inside 3D Mems; "Expanding the Role of 3D MEMS Technology to Meet Exploding Data Bandwidth Demands"; Jul. 2010, 7 pages.

(Continued)

*Primary Examiner* — Dzung D Tran
(74) *Attorney, Agent, or Firm* — Barry IP Law, P.C.

(57) ABSTRACT

A Multi-Chip Module (MCM) includes a substrate and a switch controller on the substrate. An optical module on the substrate includes at least one optical crosspoint switch for selectively routing optical signals received by the optical module out of the MCM without the MCM converting the optical signals into electrical signals for processing data from the optical signals by the switch controller. According to another aspect, at least one memory on the substrate is electrically connected to the switch controller by a parallel bus. In another aspect, the MCM includes a plurality of input optical paths for receiving optical signals from outside the MCM, a plurality of output optical paths for transmitting optical signals from the MCM, and a plurality of optical crosspoint switches each connecting an input optical path to an output optical path to selectively route optical signals.

20 Claims, 8 Drawing Sheets

Related U.S. Application Data (60) Provisional application No. 62/662,480, filed on Apr. 25, 2018.

(51) Int. Cl.
  *H04B 10/29* (2013.01)
  *H04Q 11/00* (2006.01)
  *H04B 10/80* (2013.01)

(52) U.S. Cl.
  CPC ........... *H04B 10/29* (2013.01); *H04B 10/803* (2013.01); *H04Q 11/0005* (2013.01); *H04Q 11/0062* (2013.01); *H04Q 2011/0039* (2013.01); *H04Q 2011/0058* (2013.01)

(56) References Cited

U.S. PATENT DOCUMENTS

| | | | |
|---|---|---|---|
| 2002/0015551 A1 | 2/2002 | Tsuyama et al. | |
| 2004/0126057 A1 | 7/2004 | Yoo | |
| 2005/0095000 A1* | 5/2005 | DeCusatis | H04Q 11/0005 398/45 |
| 2005/0207427 A1 | 9/2005 | Su et al. | |
| 2007/0110439 A1 | 5/2007 | Beshai et al. | |
| 2010/0266276 A1* | 10/2010 | Zheng | G02B 6/2804 398/43 |
| 2014/0321852 A1 | 10/2014 | Beshai | |
| 2015/0016818 A1 | 1/2015 | Maeda et al. | |
| 2016/0301996 A1 | 10/2016 | Morris et al. | |
| 2016/0366498 A1* | 12/2016 | Robinson | H04Q 11/0005 |
| 2017/0041691 A1* | 2/2017 | Rickman | H04Q 11/0071 |
| 2017/0124860 A1 | 5/2017 | Shih et al. | |
| 2018/0129172 A1* | 5/2018 | Shrivastava | G02F 1/163 |
| 2019/0068293 A1 | 2/2019 | Gomez | |

OTHER PUBLICATIONS

Brian Bailey; Semiconductor Engineering; "Get Ready for Integrated Silicon Photonics"; Apr. 12, 2018; 11 pages; available at https://semiengineering.com/preparing-for-integrated-silicon-photonics/.

Finisar; "Programmable narrow-band filtering using the WaveShaper 1000S and WaveShaper 4000S"; https://www.finisar.com/sites/default/files/resources/white_paper_waveshaper_basics.pdf; 2012, 5 pages.

Gill et al; "Distributed electrode Mach-Zehnder modulator with double-pass phase shifters and integrated inductors"; Jun. 18, 2015; 9 pages.

Jeff Stuecheli; IBM Corporation; "Power8/9 Deep Dive"; 2006, 31 pages.

Samuel Wan; eTeknix; "Intel Kaby Lake-G Processors May Feature Discrete GPU with HBM2"; 6 pages; available at https://www.eteknix.com/intel-kaby-lake-g-processors-may-feature-discrete-gpu-with-hbm2/; accessed Jun. 29, 2018.

Ajima et al; "Tofu: Interconnect for the K computer"; Fujitsu Sci. Tech. J., vol. 48, No. 3, Jul. 2012, pp. 280-285.

Zvonimir Z. Bandic; "Realizing the Next Generation of Exabyte-scale Persistent Memory-Centric Architectures and Memory Fabrics"; Jan. 24, 2018, 20 pages.

International Search Report and Written Opinion dated Jul. 3, 2019 from parent counterpart International Application No. PCT/US2019/024308, 11 pages.

Office Action dated Nov. 15, 2018, from issued U.S. Appl. No. 16/024,734, filed Jun. 29, 2018, entitled "Node Configuration in Optical Network", Robert P. Ryan.

* cited by examiner

NODE WITH COMBINED OPTICAL AND ELECTRICAL SWITCHING

CROSS-REFERENCE TO RELATED APPLICATIONS

This application is a continuation of U.S. application Ser. No. 16/024,723, filed on Jun. 29, 2018, entitled "NODE WITH COMBINED OPTICAL AND ELECTRICAL SWITCHING", which claims the benefit of Provisional Application No. 62/662,480, filed on Apr. 25, 2018, entitled "COMBINED STANDARD AND OPTICAL SWITCH FOR MEMORY CENTRIC COMPUTE", each of which are hereby incorporated by reference in their entirety.

BACKGROUND

Due to increasing demands for data storage and data processing, new approaches have been proposed using networks comprising, for example, memory nodes and/or processing nodes to distribute the processing and storage of data across the nodes in the network. In some cases, networks have been proposed that include optical connections among some or all of the nodes to improve bandwidth among the nodes. However, in such cases, the routing of optical signals among the nodes involves converting the optical signals into electrical signals for processing before sending the optical signal back out to the next node toward the optical signal's intended final location.

In addition, the nodes themselves have conventionally included Printed Circuit Board Assemblies (PCBAs) with copper traces among the components within the node, such as a memory chip and a network interface on the PCBA. Although use of the latest PCBA techniques may be sufficient for current data processing needs, future systems will need faster connections among the components in the node with greater bandwidth. PCBA dielectric is also generally lossy at the high speeds desired for emergent data processing systems. Although the addition of more copper traces or lanes on the PCBA can provide greater bandwidth, this approach is limited by space on the PCBA.

A recent approach in the miniaturization of electronics has been the use of Multi-Chip Modules (MCMs) where multiple Integrated Circuits (ICs), semiconductor dies, and/or other components are integrated on a substrate. For example, in the case of Dynamic Random Access Memories (DRAMs), an MCM has been proposed as a High Bandwidth Memory (HBM) with DRAM dies stacked vertically to reduce the footprint of the MCM and a silicon interposer for connection to a substrate.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Node Examples

Figure 1:
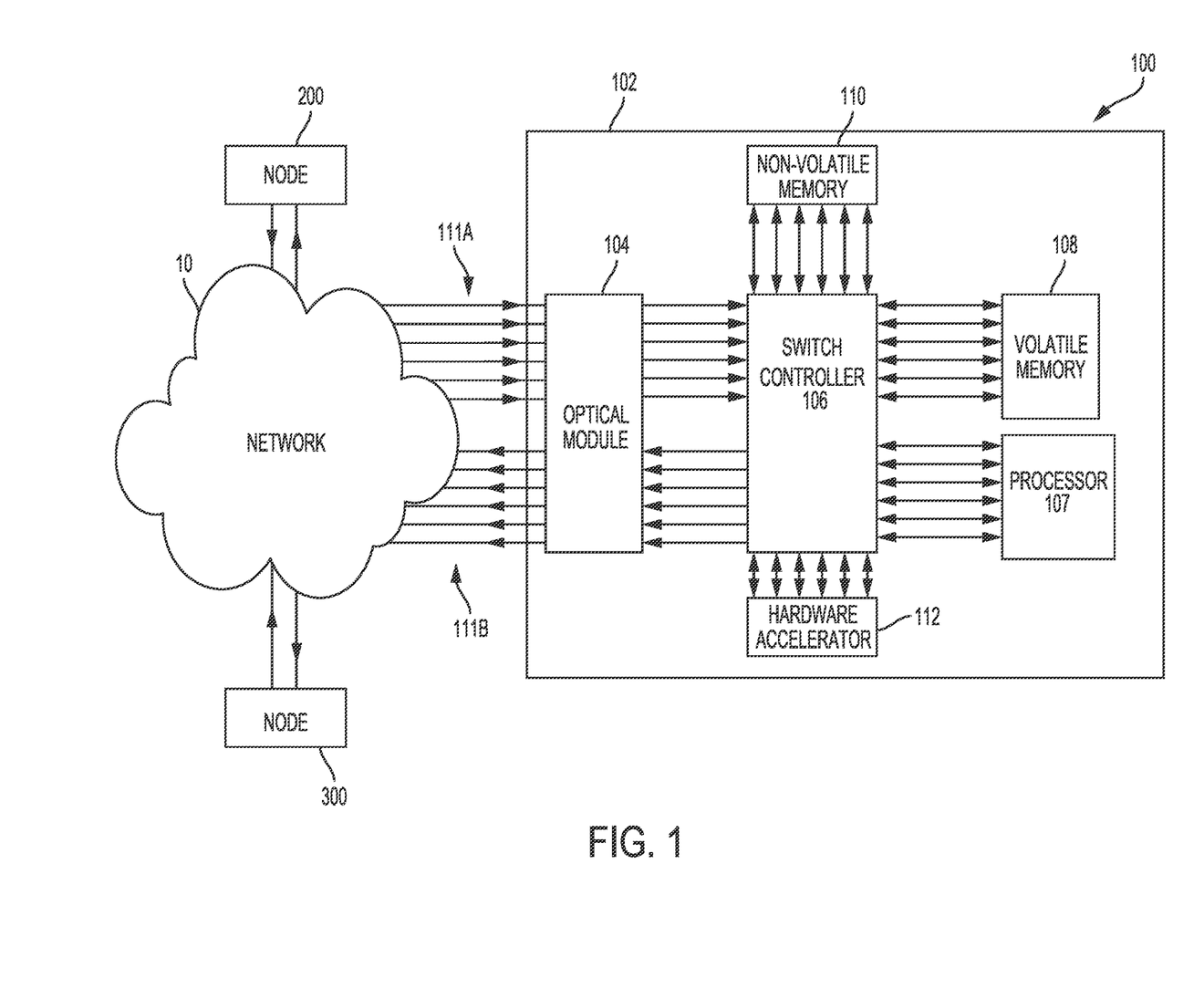
FIG. 1 is a block diagram of a node in a network according to an embodiment.

FIG. 1 is a block diagram of node 100 according to an embodiment. In the example of FIG. 1, node 100 is a node in network 10 of nodes including nodes 200 and 300. As discussed in more detail below, network 10 includes optical fibers or interconnects that optically connect nodes in network 10. In some implementations, network 10 can include an interconnected mesh network with nodes that connect to more than one other node in the network, such as in an n-dimensional torus interconnect.

Although a higher number of interconnects or dimensions among the nodes in a network can provide a faster connection between nodes by reducing the number of intermediate nodes or hops needed to process and send data from one node to the next, the number of optical fibers or interconnects needed in the network increases as the number of nodes increase. In cases where many nodes are in the network, such as in forthcoming networks that may include hundreds or thousands of nodes, the number of optical fibers or interconnects can become unmanageable in terms of physical space and in terms of the processing and memory resources needed at each node for directing optical signals in the network.

In one aspect, the present disclosure provides examples of nodes that can route optical signals received by the node out of the node without buffering data from the optical signals or without converting the received optical signals into electrical signals for processing data from the optical signals. As discussed in more detail below, such routing can make better use of a lower number of optical fibers or interconnects per node by making some or all of the intermediate nodes effectively transparent in terms of latency. In addition, the power consumption and resources used (e.g., memory and processing resources) at such transparent intermediate nodes for handling the routed optical signals is effectively eliminated.

In the example of FIG. 1, each of nodes 100, 200, and 300 may have the same construction or may differ. For example, nodes 100 and 200 may be processing or compute nodes including one or more processors for processing data stored locally at the node or at various other nodes in network 10. Continuing with this example, node 300 may be a memory node including a relatively large persistent or volatile memory for storing data that may be shared with other nodes in network 10.

As shown in FIG. 1, node 100 includes optical module 104, switch controller 106, processor 107, volatile memory 108, non-volatile memory 110, hardware accelerator 112, and substrate 102. In the example of FIG. 1, each of optical module 104, processor 107, volatile memory 108, non-volatile memory 110, and hardware accelerator 112 connect to switch controller 106 via a parallel bus or parallel connection. In other implementations, node 100 may include different components or a different arrangement of components. For example, some implementations of node 100 may include a management port, such as an Ethernet port, that connects to switch controller 106 or processor 107 used for network management, configuring, programming, or troubleshooting node 100, or for providing a secondary data connection. In other embodiments, some of the components 107, 108, 110 and 112 may be omitted, or some of them may be integrated together. For example, a type of Storage Class Memory (SCM) such as Magnetoresistive RAM (MRAM), Phase Change Memory (PCM), Resistive RAM (ReRAM) or another type of SCM, may be used as non-volatile memory 110, in which case volatile memory 108 may be omitted. In some embodiments, processor 107 may be combined with switch controller 106 as a single controller/processor unit.

In one example, node 100 can include a Multi-Chip Module (MCM) as in the example of FIG. 2 discussed below, with components such as switch controller 106 and optical module 104 connected via interposers on substrate 102, which may include, for example, a silicon substrate, a Printed Circuit Board (PCB), or a ceramic. An MCM construction of node 100 can ordinarily provide a more compact arrangement of components. In other examples, node 100 may have a different construction, such as with components such as switch controller 106 and optical module 104 connected via copper traces on substrate 102, which may include a PCB. Node 100 in some implementations may include other space saving configurations such as vertically stacking chips such as Silicon Photonics (SiPho) chips in optical module 104 or Dynamic Random Access Memory (DRAM) chips in volatile memory 108.

Switch controller 106 includes circuitry for controlling optical module 104 and for processing data received from optical signals via optical module 104. Switch controller 106 may include, for example, one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, switch controller 106 can include a programmable network switch chip or a System on a Chip (SoC) including its own memory and/or multiple processors. In this regard, switch controller 106 may store computer-executable instructions (e.g., a firmware or software) for operating node 100 including the optical routing processes discussed below. As discussed in the examples of FIGS. 2 to 4 switch controller 106 can also form part of an SoC that can include other components such as hardware accelerator 112, processor 107, or an FPGA, such as FPGA 190 in the example of SoC 109 in FIG. 4.

As shown in FIG. 1, optical module 104 includes input optical paths connected to input optical fibers 111A, and output optical paths connected to output optical fibers 111B. Each of input optical fibers 111A can connect to different nodes in network 10. Similarly, each of output optical fibers 111B can connect to different nodes in network 10.

As discussed in more detail below with reference to FIGS. 3 and 5, each input optical path is configured to receive optical signals from outside of node 100, and an optical to electrical converter of optical module 104 is configured to convert optical signals received on the input optical path into electrical signals to send to switch controller 106. Similarly, each output optical path is configured to transmit optical signals from node 100 to network 10, and an electrical to optical converter of optical module 104 is configured to convert electrical signals from switch controller 106 into optical signals to transmit via the output optical path.

In some cases, switch controller 106 may determine that data from one or more optical signals received by optical module 104 is to be processed by processor 107 or hardware accelerator 112. In other cases, switch controller 106 may determine that data from one or more optical signals received by optical module 104 is to be stored in volatile memory 108 or non-volatile memory 110. In yet other cases, switch controller 106 may control optical module 104 to convert the received data back into one or more optical signals to be sent from node 100 to another node via network 10. In yet still other cases, switch controller 106 may control optical module 104 to route optical signals received by optical module 104 out of node 100 to another node in network 10.

In this regard, node 100 can provide both optical and electrical/standard switching to achieve three different functions. As a first function, node 100 may receive data from network 10 for processing or storage by a local component of node 100. As a second function, node 100 may provide a standard network or electrical switching operation by converting a received optical signal into an electrical signal, and back into an optical signal for retiming, error correction, reshaping, and/or improving the strength of the optical signal to send to another node. As a third function, node 100 may provide an optical switching by bypassing certain electrical processing that ordinarily adds latency, such that node 100 acts as a "transparent" intermediate node.

As discussed in more detail below, switch controller 106 may identify an address from an optical signal received by optical module 104 corresponding to one or more nodes in network 10. Switch controller 106 may then determine whether to activate an optical crosspoint switch of optical module 104 to route one or more subsequent optical signals received by optical module 104 out of node 100 without buffering data from the one or more subsequent optical signals or without converting the subsequent one or more optical signals into electrical signals for processing data from the one or more subsequent optical signals.

As used herein, an optical crosspoint switch refers to a switch that can direct light from an input optical path to an output optical path. Optical module 104 includes one or more such optical crosspoint switches, and may optionally include one or more arrays of such optical crosspoint switches, as described in more detail below with reference to FIGS. 6 and 8.

Processor 107 includes circuitry such as, for example, one or more processors for executing instructions and can include a microcontroller, a DSP, an ASIC, an FPGA, hard-wired logic, analog circuitry and/or a combination thereof. In some implementations, processor 107 can include an SoC. In addition, processor 107 in some implementations may include a Reduced Instruction Set Computer (RISC) based processor (e.g., RISC-V, ARM) or a Complex Instruction Set Computer (CISC) based processor. As noted above, processor 107 may allow node 100 to serve as a processing node or compute node in network 10, such as for distributed computing among different nodes in network 10. Processor 107 may perform processing or computations using data received from optical module 104 and/or processing of data stored in volatile memory 108 or non-volatile memory 110.

Hardware accelerator 112 can include special purpose circuitry for processing data for switch controller 106 or for performing a particular operation or set of operations, such as a cryptographic, an analytic, or a data coherency function (e.g., ensuring memory access location coherency). In some implementations, hardware accelerator 112 may be used to correlate an address included in data from an optical signal to an optical crosspoint switch in optical module 104 for sending or receiving an optical signal.

Volatile memory 108 can include a memory that interfaces with switch controller 106, processor 107, or hardware accelerator 112 to provide data stored in volatile memory 108 during execution of instructions or functions in software programs, such as an application executed by processor 107. Volatile memory 108 can include a memory that can be quickly accessed, such as a DRAM. In other implementations, volatile memory 108 can include, or can be replaced by, other types of solid-state memory, including non-volatile memory that can be quickly accessed, such as MRAM or other types of SCM.

Non-volatile memory 110 can allow node 100 to serve as a memory node by providing a relatively larger storage capacity than other nodes in network 10. In some implementations, data may be shared or distributed among nodes in network 10 for access or processing by different nodes on network 10. Non-volatile memory 110 includes a persistent storage for storing data across power cycles, and can include, for example, a Hard Disk Drive (HDD), a solid-state memory such as an SCM, a combination of both types of memory, or sets of such memories.

While the description herein refers to solid-state memory generally, it is understood that solid-state memory may comprise one or more of various types of memory devices such as flash integrated circuits, Chalcogenide RAM (C-RAM), Phase Change Memory (PCM, PC-RAM or PRAM), Programmable Metallization Cell RAM (PMC-RAM or PMCm), Ovonic Unified Memory (OUM), ReRAM, NAND memory (e.g., Single-Level Cell (SLC) memory, Multi-Level Cell (MLC) memory, or any combination thereof), NOR memory, EEPROM, Ferroelectric Memory (FeRAM), MRAM, other discrete NVM chips, or any combination thereof.

As noted above, node 100 may include an MCM construction or may be a device with a different type of construction, such as components on a PCB with traces between some or all of the components. In addition, other implementations of node 100 may include a different number of components or a different arrangement of components. For example, other implementations may not include one or more of hardware accelerator 112, processor 107, volatile memory 108, or non-volatile memory 110. In addition, one or more these components may be formed together as an SoC in some implementations, such as where switch controller 106, processor 107, and hardware accelerator 112 are formed together as a single SoC, as shown in the example of FIG. 3. In yet other implementations, additional components may be included in node 100, such as with FPGA 190 shown in the example of FIG. 4.

Figure 2:
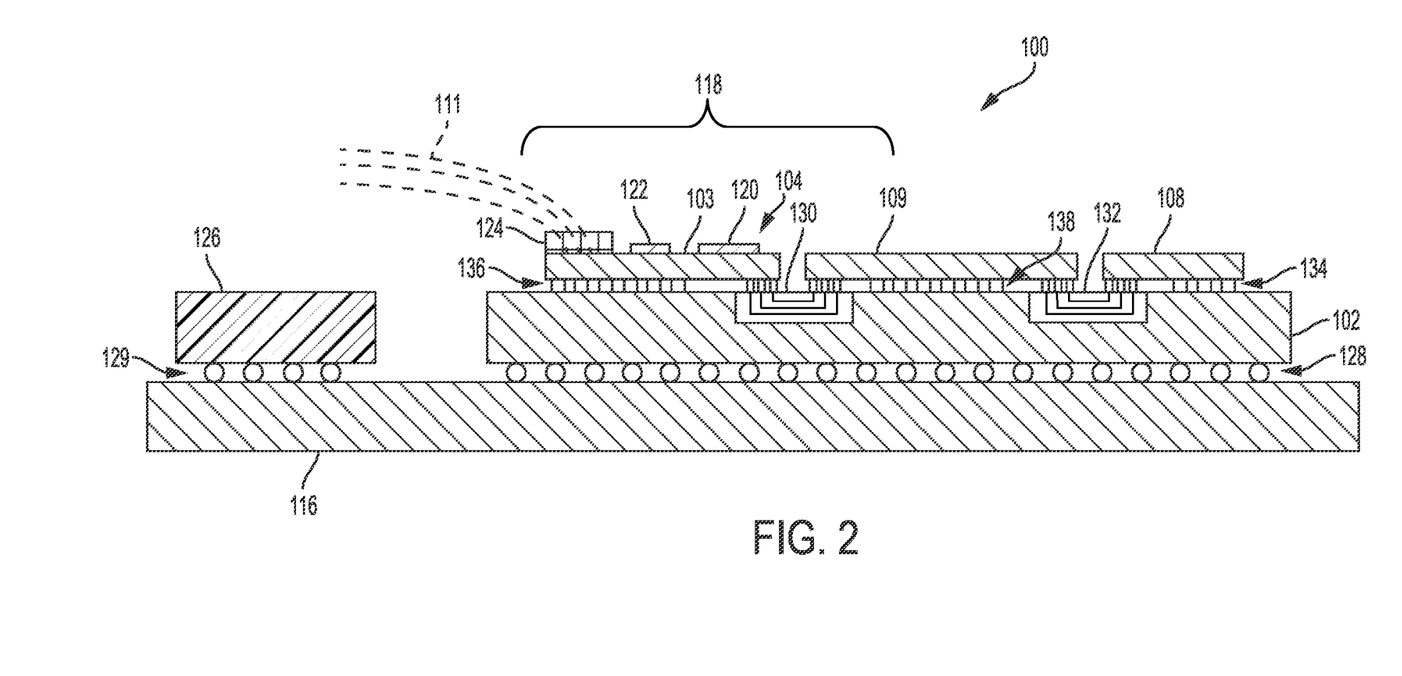
FIG. 2 is a cross-section view of a Multi-Chip Module (MCM) node according to an embodiment.

FIG. 2 is a cross-section view of node 100 as an MCM according to an embodiment. As shown in FIG. 2, node 100 includes optical module 104, SoC 109, and volatile memory 108 on substrate 102. In the example of FIG. 2, SoC 109 can include switch controller 106, processor 107, and hardware accelerator 112. In other implementations, one or more of these components may be separately formed in its own chip on substrate 102.

In FIG. 2, node 100 is mounted on PCBA 116 via ball grid array 128 to receive power from power and management module 126, which is mounted on PCBA 116 via ball grid array 129. In some implementations, power and management module 126 may also provide a management interface to node 100, such as through a management port (not shown) of power and management module 126 for troubleshooting, configuring, programming, or providing network management of PCBA 116 or node 100.

Each of optical module 104, SoC 109, and volatile memory 108 receive power and structural support from vias 136, 138 and 134, respectively. As shown in FIG. 2, optical module 104 and a portion of SoC 109 including switch controller 106 form switch 118, which is configured to send and receive data on network 10, and also configured to route data between components within node 100. In this regard, switch 118 is spread across optical module 104 and a portion of SoC 109.

In the example of node 100 in FIG. 2, optical module 104 and volatile memory 108 connect to SoC 109 via high speed silicon interposers 130 and 132, respectively. As shown in FIG. 2, interposers 130 and 132 include parallel connections or a parallel bus that is embedded in substrate 102. This arrangement of an embedded interposer can be referred to as a silicon bridge and can ordinarily provide a higher density of connections between optical module 104 and SoC 109, and between volatile memory 108 and SoC 109, as compared to using vias in substrate 102 or a separate interposer layer between substrate 102 and components on substrate 102, such as SoC 109, optical module 104, and volatile memory 108. Such higher density connections can provide more parallel connections in a smaller space on substrate 102 resulting in a higher bandwidth with less signal loss due to the shorter connections. In some implementations, the parallel connections can include, for example, 1,024 lanes or parallel connections that may be grouped together into subsets of lanes.

The shorter connections provided by using silicon bridges embedded in substrate 102 can reduce the amount of error correction needed since the Signal-to-Noise Ratio (SNR) generally improves with shorter connections. The improved SNR can also facilitate the transfer of data through interposers 130 and 131 at higher speeds than otherwise possible with longer connections, since the SNR typically degrades at higher speeds. In addition, the use of embedded interposers or silicon bridges can provide a lower cost as compared to using a larger interposer on the surface of substrate 102.

Optical module 104 in the example of FIG. 2 includes fiber connect 124 for connecting optical fibers 111 to optical paths within die 103 of optical module 104. Die 103 may include, for example, a SiPho die including optical paths as silicon waveguides with photodetectors and modulators for edge optical couplers. In some implementations, die 103 may include stacked or bonded layers for different sets of optical paths. For example, each layer of die 103 may include one or more input optical paths and one or more output optical paths connected by respective optical crosspoint switches. Examples of such arrangements are discussed in more detail below with reference to FIGS. 3, 5, 6, and 8.

As shown in FIG. 2, optical module 104 includes light source 122 for optical transmission from optical module 104. In some implementations, light source 122 may include III-V semiconductor materials such as gallium arsenide (GaAs) or aluminum gallium arsenide (AlGaAs) with silicon to provide, for example, a hybrid silicon laser (e.g., laser $144_1$ shown in FIG. 3). In some implementations, light source 122 may be in an external module with light delivered to optical module 104 through one or more optical fibers. Optical module 104 also includes switch logic 120, which may include, for example, Complementary Metal-Oxide-Semiconductor (CMOS) or Bipolar CMOS (BiCMOS) logic circuits.

As will be appreciated by those of ordinary skill in the art, node 100 in other implementations may include different components or a different arrangement of components than those shown in FIG. 2. For example, other implementations may include light source 122 and switch logic 120 integrated into the same die 103 as the waveguides and optical crosspoint switches. As another example, node 100 may also include components for cooling portions of node 100 such as light source 122 and/or SoC 109. Such cooling may be provided, for example, by air, water, or immersion cooling with appropriate thermal interfaces.

Figure 3:
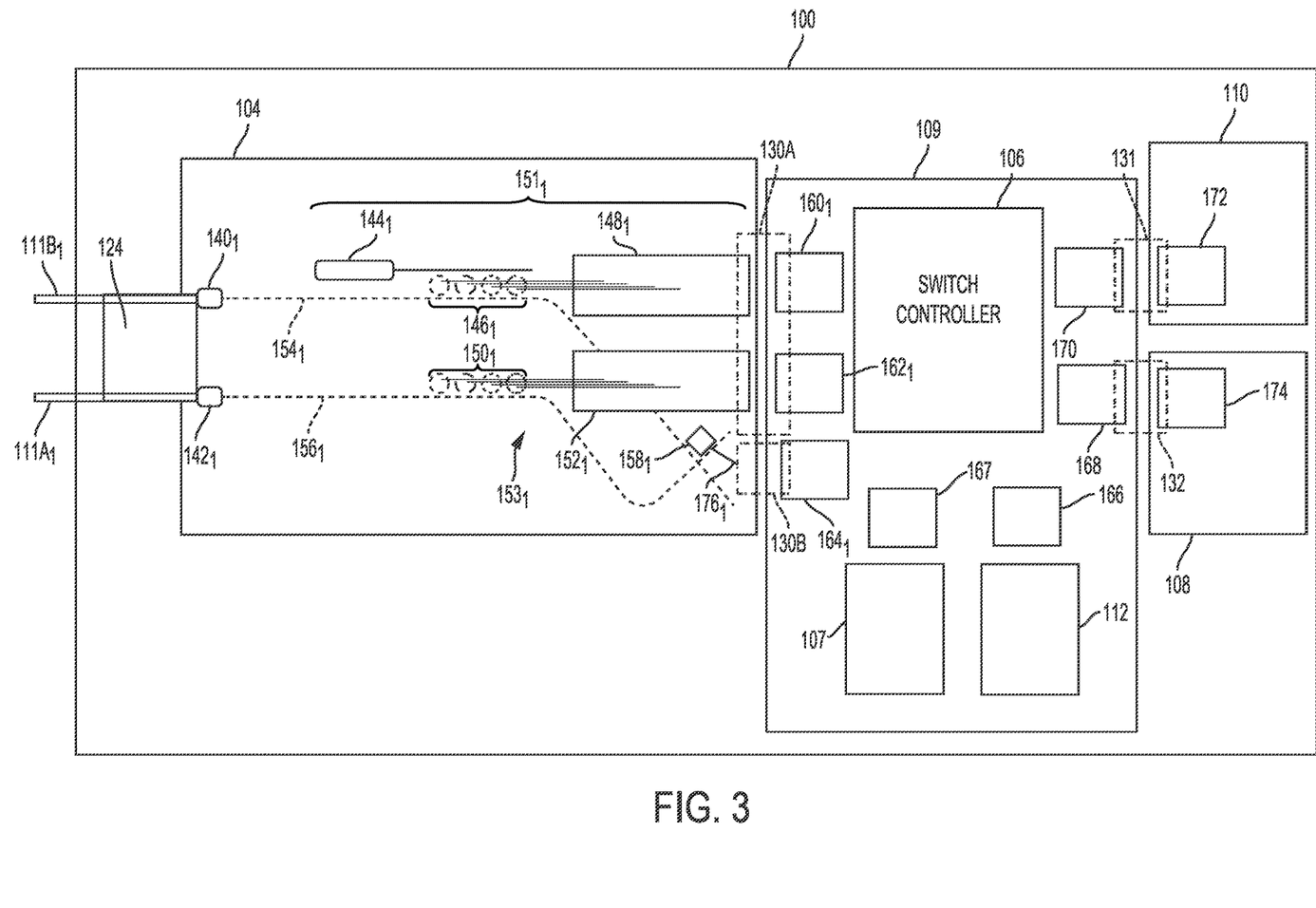
FIG. 3 is a block diagram of an MCM node according to an embodiment.

FIG. 3 is a block diagram of an example of node 100 showing components of optical module 104 and SoC 109 according to an embodiment. As will be appreciated by those of ordinary skill in the art, different implementations of node 100 can include different components or a different arrangement of components than those shown in FIG. 3.

As shown in FIG. 3, optical module 104 includes output optical path $154_1$ and input optical path $156_1$. Output optical path $154_1$ connects to fiber connect 124 via coupler $140_1$ to route optical signals out of node 100 through optical fiber $111B_1$. Laser $144_1$ supplies light to modulators $146_1$ shown as rings in FIG. 3 at different frequencies corresponding to different wavelengths or colors of light. In some implementations, laser $144_1$ may include a Continuous Wave (CW) comb laser.

The different modulators $146_1$ (represented by four circles with different line markings to denote the different modulators) are activated by electrical signals sent from driver amplifier $148_1$ in response to electrical signals received from switch controller 106. In this regard, laser $144_1$, modulators $146_1$ and driver amplifier $148_1$ form electrical to optical converter $151_1$ configured to convert electrical signals received from switch controller 106 into optical signals to transmit outside of node 100 via output optical path $154_1$. In the example of FIG. 3, modulators $146_1$ are shown as ring modulators. Other implementations may use different components for an electrical to optical converter, such as, for example, disk modulators, Mach Zehnder structures, graphene on D-microfiber modulators, or Micro Electro Mechanical System (MEMS) mirrors in place of ring modulators.

In the example of FIG. 3, the activation of modulators $146_1$ allow for light at a particular frequency to travel on output optical path $154_1$ as an optical signal output from optical module 104. In this regard, multiple optical signals at different frequencies can travel simultaneously on the same output optical path $154_1$ to increase the bandwidth of data traveling out of optical module 104. Electrical to optical converter $151_1$ for output optical path $154_1$ is configured to convert electrical signals received from switch controller 106 into optical signals to transmit outside of node 100 via output optical path $154_1$, and multiplex multiple optical signals for simultaneous transmission on output optical path $154_1$.

In addition, optical module 104 can include a plurality of output optical paths and a plurality of input optical paths, each capable of simultaneously carrying different optical signals at different frequencies. Although four resonators and four modulators are shown in the example of FIG. 3, other implementations may use a different number of resonators and modulators for a different number of frequencies of light. For example, 12 different frequencies of light (i.e., channels) each providing 100 GB/s can be multiplexed into one optical path providing 1.2 TB/s on the optical path. If 24 output optical paths 154 and 24 input optical paths 156 are used in a given node, the total bandwidth for the node in such an example would be approximately 28 TB/s.

In the example of FIG. 3, input optical path $156_1$ connects to input optical fiber $111A_1$ through fiber connect 124 and coupler $142_1$. Optical signals received via input optical fiber $111A_1$ are detected by ring resonators and corresponding Avalanche PhotoDiodes (APDs) $150_1$ that provide electrical signals to TransImpedance Amplifier (TIA) $152_1$. In some implementations, one or more components of optical to electrical converter $153_1$, such as ring resonators and/or TIA $152_1$ may provide reshaping of the signals, such as by filtering out frequencies outside of a particular optical or electrical frequency band. The electrical signals are then provided to switch controller 106 for processing. In this regard, resonators and APDs $150_1$, together with TIA $152_1$ form optical to electrical converter $153_1$, which is configured to convert optical signals received on input optical path $156_1$ into electrical signals for processing by switch controller 106. Other implementations may use different components for an optical to electrical converter, such as by using a different type of photodiode, or by using disk resonators, Mach Zehnder structures, or MEMS mirrors in place of ring resonators.

In addition, some implementations may include one or more level splitters in optical to electrical converter $153_1$ configured to receive a portion of an optical signal for measuring a signal strength of the optical signal. The signal strength may then be used by switch controller 106 for determining whether to route subsequent optical signals via crosspoint switch $158_1$ or to retime or convert subsequent optical signals to increase the signal strength. In yet other cases, a level splitter may be used to periodically observe input optical path $156_1$ for completion of a series of related optical signals or to identify an error or exception in the transmission of optical signals on input optical path $156_1$.

As discussed in more detail below with reference to FIG. 5, optical module 104 also includes optical crosspoint switches 158, such as optical crosspoint switch $158_1$, which is configured to selectively route optical signals received by optical module 104 out of node 100 without node 100 buffering data from the received optical signals or without converting the received optical signals into electrical signals for processing data from the received optical signals by switch controller 106. Optical crosspoint switch $158_1$ may include, for example, ring resonators, disk resonators, Mach Zehnder structures, or MEMS mirrors that when activated, direct optical signals from input optical path $156_1$ onto output optical path $154_1$.

The activation of optical crosspoint switch $158_1$ at a particular frequency may correspond to a deactivation of a resonator $150_1$ and the disabling of an electrical path for that particular frequency so that the optical signals received for that frequency of light are not converted and/or transmitted to switch controller 106. In some implementations, an entire amplifier, such as TIA $152_1$ may be powered off in addition to other components along the disabled electrical path, such as Seializer/Deserializer (SerDes) interface $162_1$, or other circuitry along the electrical path to switch controller 106. This powering off of electrical components can ordinarily reduce power consumption of node 100, which may be multiplied for a plurality of optical input paths in node 100.

Driver amplifier $148_1$ for output optical path $154_1$ connects to transmitting SerDes interface $160_1$ of SoC 109 via high speed silicon interposer 130A. In addition, TIA $152_1$ for input optical path $156_1$ connects to SerDes interface $162_1$ of SoC 109 via high speed silicon interposer 130A. Transmitting SerDes interface $160_1$ of SoC 109 may receive different electrical signals in parallel from switch controller 106 for data to be sent in different respective optical signals on output optical path $154_1$. Transmitting SerDes interface $160_1$ serializes the data from the parallel electrical signals received from switch controller 106 for transmission through interposer 130A. Driver amplifier $148_1$ of optical module 104 converts the high speed serial data received through interposer 130A to electrical signals to activate respective modulators $146_1$. In some implementations, driver amplifier $148_1$ may also provide for reshaping or filtering of the electrical signals.

Receiving SerDes interface $162_1$, on the other hand, may receive serialized data in the form of electrical signals from TIA $152_1$ representing different optical signals received on input optical path $156_1$. Receiving SerDes interface $162_1$ deserializes the data received via interposer 130A into parallel electrical signals corresponding to the different optical signals for processing by switch controller 106.

In other implementations, one or both of SerDes interfaces $160_1$ and $162_1$ may instead be located on the other side of interposer 130A so as to be included in optical module 104. However, the location of SerDes interfaces $160_1$ and $162_1$ in SoC 109 reduces the number of connections needed.

The use of receiving SerDes interface $162_1$ and transmitting SerDes interface $160_1$ in FIG. 3 can ordinarily allow for a relatively large number of optical paths and optical crosspoint switches 158 for a given size or number of connections in interposer 130A. As discussed in more detail below, other components connected to SoC 109, such as non-volatile memory 110 or volatile memory 108 may instead use a parallel interface or parallel bus without serialization and deserialization. In this regard, parallel connections such as a parallel interface or parallel bus that travels a relatively short distance (e.g., within the same MCM node 100) are less likely to experience skewing or a temporal mismatch of the data among the high speed parallel signals as compared to other data paths that have a longer distance. The data received via input optical paths, on the other hand, may typically be received as one or more serialized channels to reduce the likelihood of skewing. In some implementations, SerDes interfaces $160_1$ and/or $162_1$ can provide for retiming of the signals as they pass through the node to their final destination node.

Although SerDes interfaces $160_1$ and $162_1$ may provide for retiming and a space savings with a greater bandwidth for a given connection, the serialization and deserialization of data can add latency to the processing of data for a given optical signal and consume power. As discussed in more detail below, the use of optical crosspoint switch $158_1$ can avoid the latency added by SerDes interfaces $160_1$ and $162_1$ in processing or buffering data that is intended for another node in network 10. This latency or hop latency increases with each intermediate node that converts the optical signal into an electrical signal for processing by the node before converting the electrical signal back into the optical signal for transmission to the next node. The use of one or more optical crosspoint switches 158 in node 100 can eliminate this hop latency, which can facilitate more nodes and/or less interconnections (i.e. optical fiber connections) between the nodes in network 10 by reducing the latency for optical signals to travel through more nodes than possible in networks with conventional nodes.

SoC 109 in the example of FIG. 3 includes switch module $164_1$, which controls the activation of optical crosspoint switch $158_1$ via high speed silicon interposer 130B and connection $176_1$ in optical module 104. In some implementations, switch module $164_1$ may include a driver circuit and/or one or more timers for controlling activation of optical crosspoint switch $158_1$.

As discussed in more detail below with reference to FIGS. 5, 6, and 8, each optical path may include multiple optical crosspoint switches 158 for selectively routing optical signals from one input optical path to an output optical path without converting the optical signals into electrical signals for processing by switch controller 106. In such implementations, each input or output optical path may include its own switch module 164 for activating the optical crosspoint switches 158 on the optical path, or even for activating particular resonators within each optical crosspoint switch 158 on the optical path.

As shown in FIG. 3, SoC 109 also includes parallel interfaces 166 and 167 for interfacing hardware accelerator 112 and processor 107, respectively, with switch controller 106. As noted above, providing a parallel interface ordinarily allows for a higher bandwidth of data between switch controller 106 and components such as processor 107 and hardware accelerator 112.

In addition, to parallel links or interfaces for components within SoC 109, the example of FIG. 3 also includes parallel interfaces 170 and 168 for connection to non-volatile memory 110 and volatile memory 108 via high speed silicon interposers 131 and 132, respectively. The use of parallel interfaces provides a higher bandwidth of data between switch controller 106 and components outside of SoC 109, such as non-volatile memory 110 and volatile memory 108. For their part, non-volatile memory 110 and volatile memory 108 include parallel interfaces 172 and 174, respectively, for sending and receiving data to components in SoC 109, such as switch controller 106, processor 107, or hardware accelerator 112.

Figure 4:
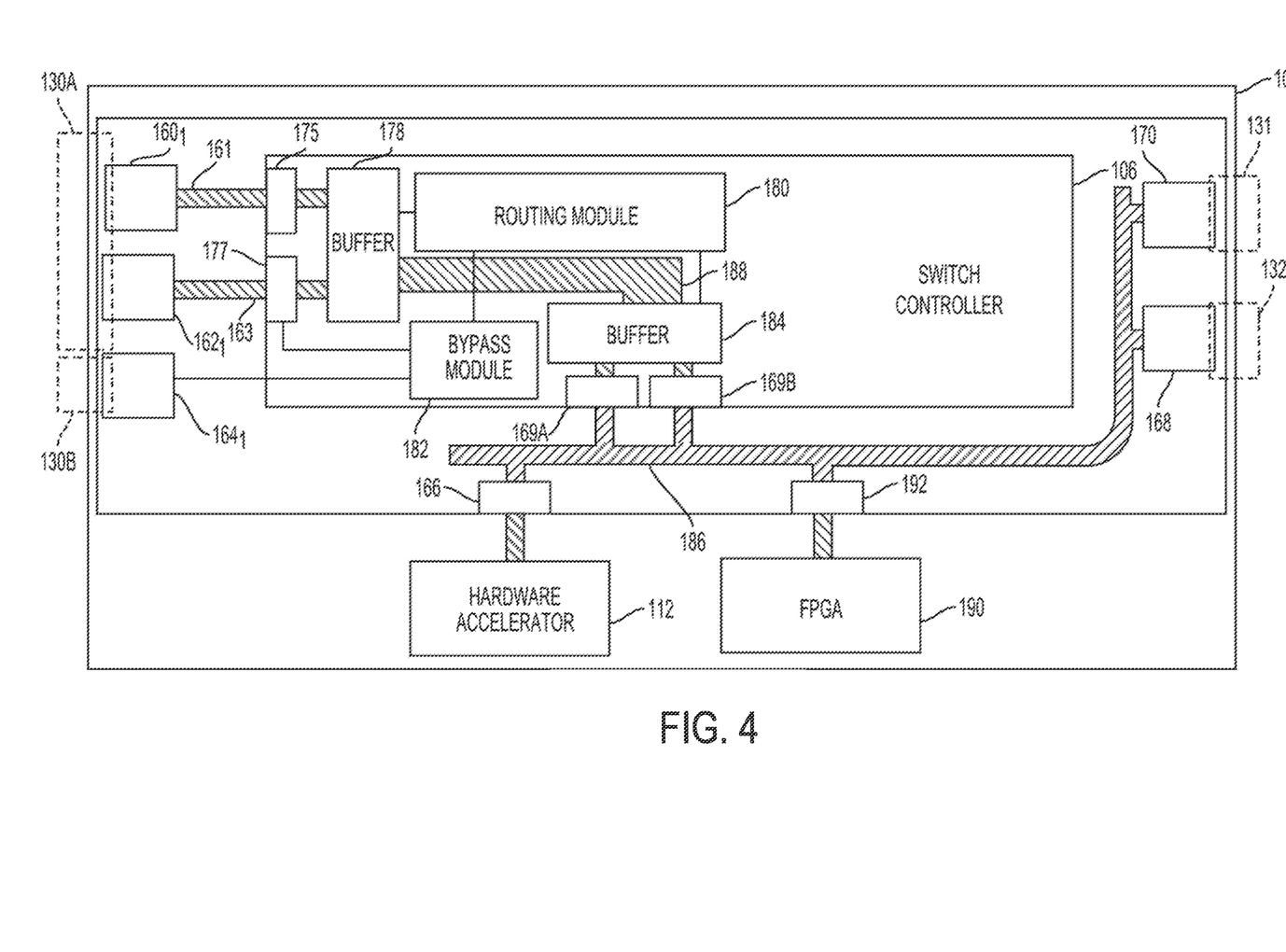
FIG. 4 is a block diagram of a System on a Chip (SoC) of a node according to an embodiment.

FIG. 4 is a block diagram of SoC 109 according to an embodiment. As will be appreciated by those of ordinary skill in the art, different implementations of SoC 109 can include different components or a different arrangement of components than those shown in FIG. 4. For example, one or both of buffers 178 and 184 shown in FIG. 4 may be located outside of switch controller 106 in other implementations.

In the example of FIG. 4, switch controller 106 is connected to parallel interfaces 166, 192, 168, and 170 via parallel bus 186 shared among the parallel interfaces for hardware accelerator 112, FPGA 190, non-volatile memory 110, and volatile memory 108. In some implementations, parallel bus 186 may operate as a memory bus and include, for example, a High Bandwidth Memory (HBM)2 bus. In other implementations, parallel bus 186 may operate as a Central Processing Unit CPU bus. In addition, parallel bus 186 may operate as an address bus using hardware addresses for the components on parallel bus 186.

In the implementation of SoC 109 shown in FIG. 4, transmitting SerDes interface $160_1$ connects to output parallel connection 161 for connection to switch controller 106. Receiving SerDes interface $162_1$ connects to input parallel connection 163 for connection to switch controller 106. Parallel connections 161 and 163 can each accommodate multiple lanes of data and connect to switch controller 106 via parallel interfaces 175 and 177, respectively. In some implementations, parallel connections 161 and 163 can include HBM2 connections.

Switch controller 106 interfaces with parallel bus 186 connecting to hardware accelerator 112, FPGA 190, non-volatile memory 110, and volatile memory 108 via parallel interfaces 169A and 169B of switch controller 106. In some implementations, parallel interface 169A handles data being input into switch controller 106, while parallel interface 169B handles data being output from switch controller 106. In other implementations, each of parallel interfaces 169A and 169B may handle data input to and output from switch controller 106.

As shown in FIG. 4, switch controller 106 includes buffer 184 for routing module 180 to inspect or analyze data received via parallel bus 186 and to arrange or package data to be sent via parallel bus 186. Data sent from switch controller 106 via parallel bus 186 can include data received via parallel connection 163 from receiving SerDes interface $162_1$ that has been converted from optical signals received by optical module 104. The data received by switch controller 106 via parallel connection 163 is buffered in buffer 178 to allow routing module 180 to inspect or analyze the received data before transferring it to buffer 184 via internal bus 188 or before repackaging and transmission of the data back to optical module 104 via parallel interface 175 and output parallel connection 161.

The buffering of data received from optical signals in buffer 178 can allow for deep packet inspection and routing within node 100 or back out of node 100 as discussed above. However, as with the latency added by SerDes interfaces $160_1$ and $162_1$ described above, the buffering and processing of data from optical signals can increases the latency or delay of optical signals traveling through network 10 via node 100. The use of optical crosspoint switches can similarly avoid the latency added by buffering and/or processing data that is intended for another node in network 10.

Data received by switch controller 106 via parallel bus 186 is buffered in buffer 184 for routing module 180 to inspect or analyze the received data. The buffered data can include data received from hardware accelerator 112, FPGA 190, non-volatile memory 110, or volatile memory 108. Routing module 180 may then route this data to buffer 178 via internal bus 188 for transmission from switch controller 106 via output parallel connection 161 to transmitting SerDes interface $160_1$ for conversion into optical signals to be output from optical module 104.

In the example of FIG. 4, bypass module 182 controls operation of switch module $164_1$, which in turn, controls the activation of one or more optical crosspoint switches in optical module 104. Bypass module 182 can provide a higher level of control than the circuitry included in switch module $164_1$. In this regard, bypass module 182 may include, for example, a processor or controller that executes computer-executable instructions (e.g., a firmware or an application) to determine whether to route one or more optical signals received after an initial optical signal out of optical module 104 without buffering data from the received optical signals or without converting the optical signals into electrical signals for processing data from the optical signals.

In some implementations, bypass module 182 may compare a signal strength of a received optical signal to a threshold signal strength in determining whether to route subsequent optical signals without buffering data from the optical signals or converting the subsequent optical signals into electrical signals for processing data from the optical signals. In other implementations, bypass module 182 may determine a number of nodes on network 10 that have previously received the initial optical signal and compare the determined number of previous nodes to a threshold number of nodes to determine whether to route the subsequent optical signals without buffering data from the optical signals or converting the subsequent optical signals to electrical signals.

Examples and further description of such routing operations are provided in co-pending U.S. patent application Ser. No. 16/024,734, entitled "NODE CONFIGURATION IN OPTICAL NETWORK", filed on Jun. 29, 2018, the entire contents of which is hereby incorporated by reference.

Optical Signal Routing Examples

Figure 5:
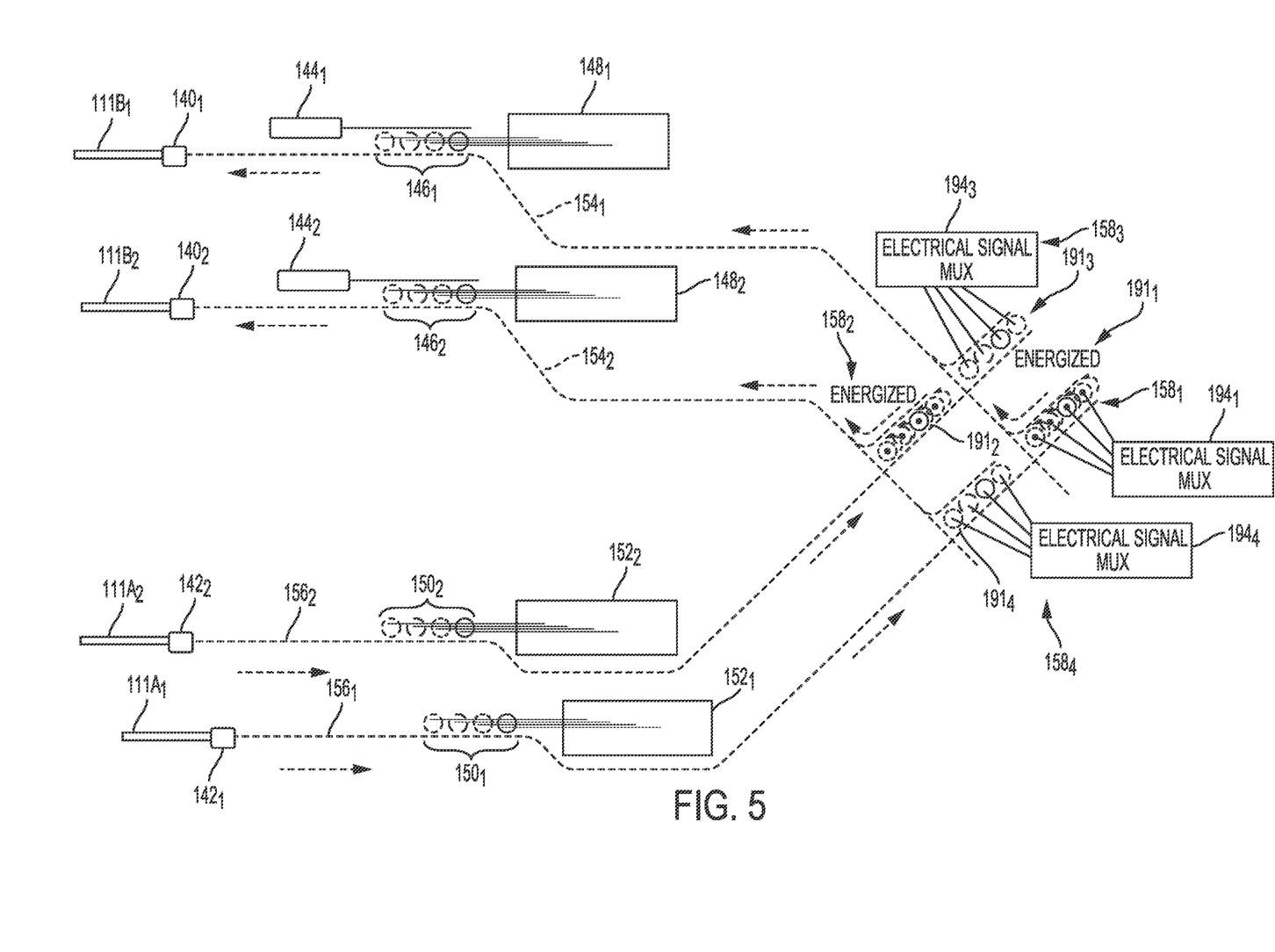
FIG. 5 depicts portions of an optical module of a node according to an embodiment.

FIG. 5 depicts portions of an optical module according to an embodiment. Components shown in FIG. 5 with similar reference numbers to components of optical module 104 shown in FIG. 3 have a similar description as provided above for FIG. 3.

As shown in FIG. 5, input optical path $156_1$ connects with output optical paths $154_1$ and $154_2$ via optical crosspoint switches $158_1$ and $158_4$, respectively. In addition, input optical path $156_2$ connects with output optical paths $154_1$ and $154_2$ via optical crosspoint switches $158_3$ and $158_2$, respectively. With this arrangement, optical signals received by optical module 104 on either of input optical paths $156_1$ or $156_2$ can be selectively routed onto either of output optical paths $154_1$ or $154_2$.

Each of optical crosspoint switches $158_1$, $158_2$, $158_3$, and $158_4$ in the example of FIG. 5 include ring resonators 191 that can be selectively activated by an electrical signal multiplexer of the optical crosspoint switch, such as by electrical signal multiplexers $194_1$, $194_3$, $194_4$. The electrical signal multiplexer for optical crosspoint switch $158_2$ is not shown in FIG. 5 to avoid unnecessarily obscuring optical crosspoint switch $158_2$.

Electrical signal multiplexers 194 can receive electrical activation signals from a switch module, such as switch module $164_1$ via connection $176_1$ in FIG. 3. In some implementations, all resonators 191 in a particular optical crosspoint switch 158 may be activated at the same time. In other implementations, one or more resonators of all of the resonators 191 may be activated to only route certain channels or frequencies of light from the input optical path to output optical path. As used herein, activation of an optical crosspoint switch can refer to the activation of at least a portion of the optical crosspoint switch.

In the example of FIG. 5, optical crosspoint switch $158_1$ is activated so that the ring resonators 1911 in optical crosspoint switch $158_1$ are energized to pass the optical signals received on input optical path $156_1$ onto output optical path $154_1$. Similarly, optical crosspoint switch $158_2$ is activated so that one or more ring resonators 1912 in optical crosspoint switch $158_2$ are energized to pass the optical signals received on input optical path $156_2$ onto output optical path $154_2$.

As will be appreciated by those of ordinary skill in the art, other implementations of an optical module may have different components or include a different arrangement of components than those shown in FIG. 5. For example, in other implementations, optical crosspoint switches 158 may be a different type of optical switch with a different construction. In this regard, optical crosspoint switches 158 may instead use disk resonators, Mach Zehnder structures, or MEMS mirrors in place of ring resonators 191.

Figure 6:
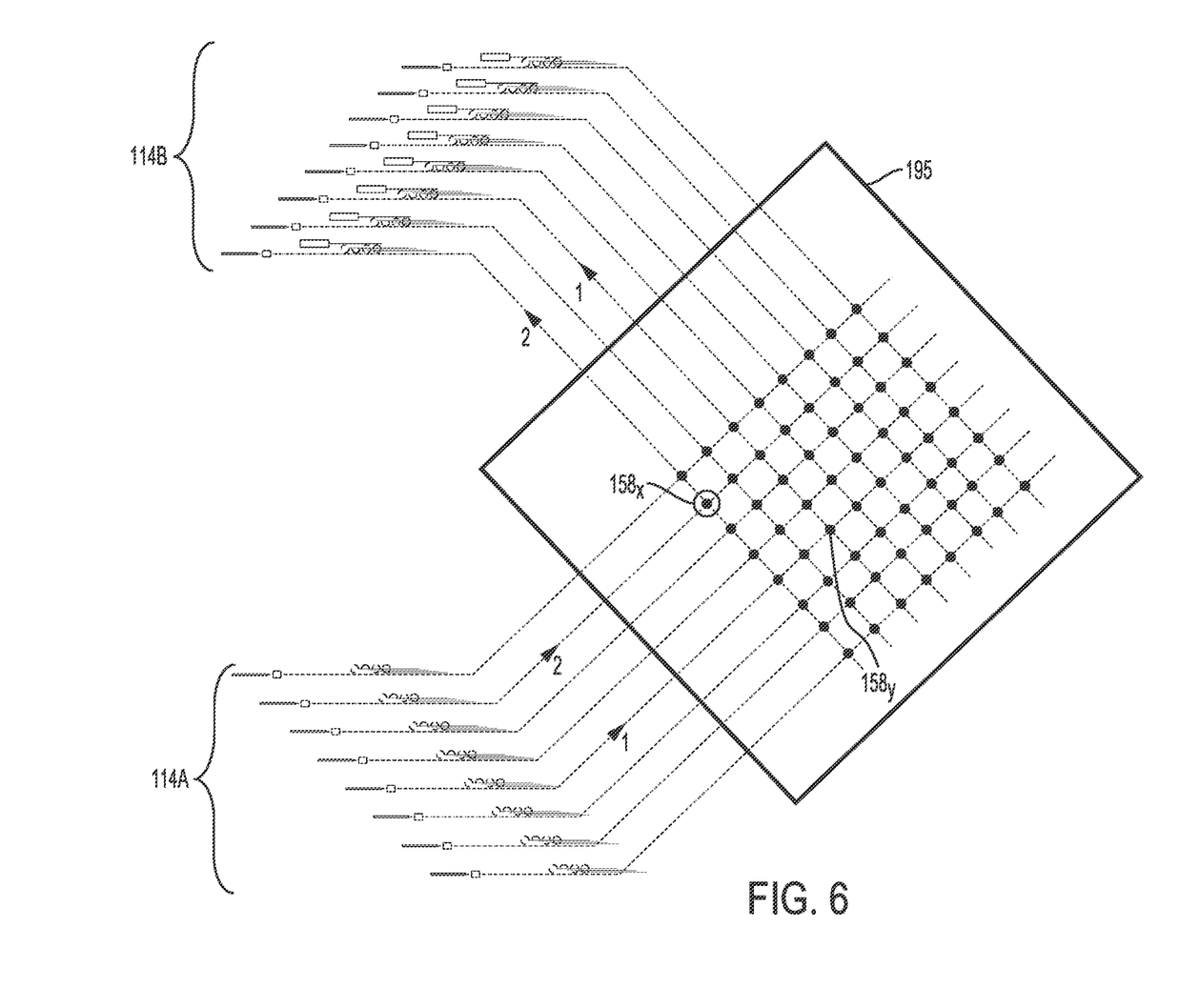
FIG. 6 depicts a switch array of an optical module according to an embodiment.

FIG. 6 depicts switch array 195 of an optical module according to an embodiment. As shown in FIG. 6, a plurality of input optical paths 114A enter switch array 195 and connect with each output optical path of a plurality of output optical paths 1146 at optical crosspoint switches 158, which are indicated as black dots at the intersection of the optical paths in FIG. 6. Switch array 195 may include, for example, an optical substrate including silicon, silicon nitride, and/or III-V semiconductor materials as waveguides for the optical paths.

In the example of FIG. 6, optical signal 1 is received via an input optical path of input optical paths 114A. Optical crosspoint switch 158y along the input optical path in switch array 195 is activated or energized so that optical signal 1 is routed or redirected out of switch array 195 on the output optical path intersecting the input optical path at optical crosspoint switch 158y. As noted above, optical crosspoint switch 158y may be activated for all channels or frequencies of light or may only be activated for particular channels or frequencies of light.

Optical signal 2 is received via a different input optical path of input optical paths 114A. Optical crosspoint switch 158x along the input optical path in switch array 195 is activated or energized so that optical signal 2 is routed or redirected out of switch array 195 on the output optical path intersecting the input optical path at optical crosspoint switch 158x. As noted above, optical crosspoint switch 158x may be activated for all channels or frequencies of light or may only be activated for particular channels or frequencies of light.

Other implementations may include a different configuration of optical paths and optical crosspoint switches. For example, some implementations may include one or more input optical paths with only one optical crosspoint switch, or optical crosspoint switches for only a subset of all of the output optical paths in optical module 104 or switch array 195.

Figure 7:
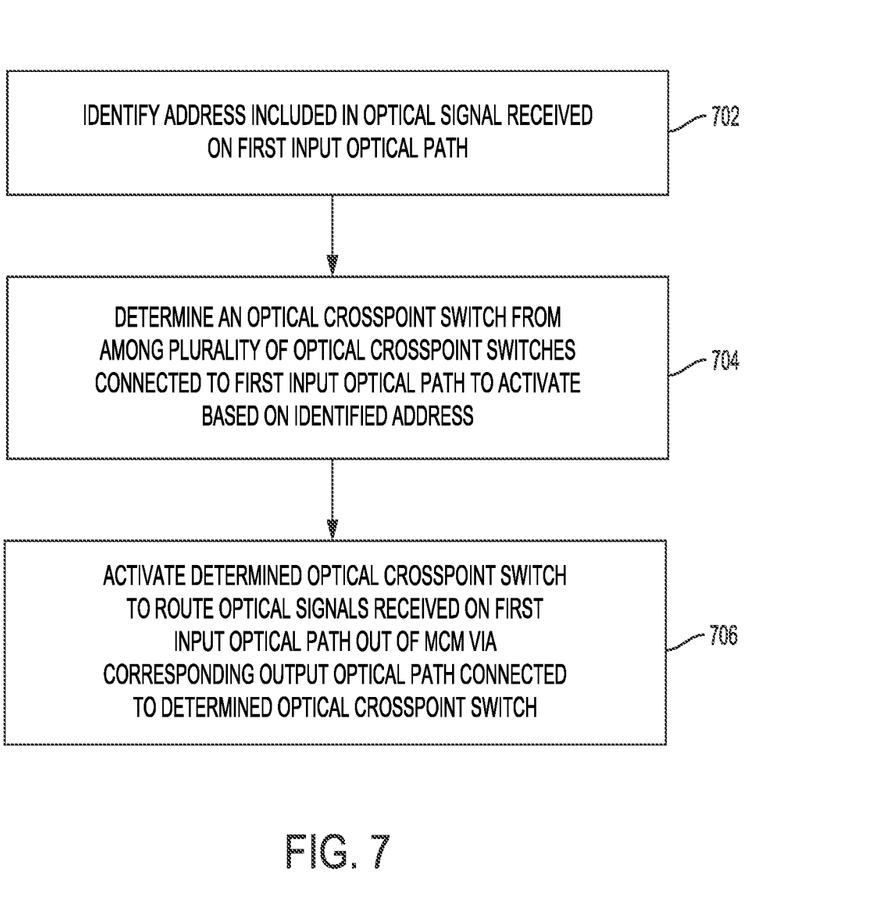
FIG. 7 is a flowchart for an optical signal routing process according to an embodiment.

FIG. 7 is a flowchart for an optical signal routing process according to an embodiment. In some implementations, the process of FIG. 7 may be performed by switch controller 106 or portions thereof, such as by bypass module 182 of switch controller 106 in FIG. 4. As noted above, switch controller 106 may execute computer-executable instructions stored in a memory of switch controller 106 to perform optical signal routing processes, such as the process of FIG. 7. This can ordinarily allow for adjustments to be made in such routing processes, such as by changing the criteria or thresholds (e.g., an optical signal strength or a count of previous nodes) used to determine whether to route certain optical signals without buffering data from the optical signal or without converting the optical signal into an electrical signal for processing data from the optical signal. The process of FIG. 7 may be performed by each node in a data processing system or by a subset of nodes in a data processing system, such as certain nodes that include multiple input optical paths and multiple output optical paths.

In block 702 in the example process of FIG. 7, switch controller 106 identifies an address included in an optical signal received on a first input optical path, such as on one of input optical paths 114A in FIG. 6. The address can correspond to a node in network 10 or may correspond to a group of nodes in network 10 accessible by a particular output optical path of optical module 104.

With reference to the example of SoC 109 in FIG. 4, bypass module 182 of switch controller 106 may access or identify an address from data stored in buffer 178 for an input optical signal using, for example, deep packet inspection. In some implementations, a destination address may be indicated by a flag or may occupy a particular position, such as in a header of a data packet buffered in buffer 178. The data buffered in buffer 178 for the optical signal may also indicate whether it is an initial optical signal or a data path command signal for a subsequent series of related optical signals to be received on the input optical path.

In block 704, switch controller 106 determines an optical crosspoint switch to activate from among a plurality of optical crosspoint switches connected to the first input optical path based on the identified address. In some implementations, an addressing scheme of network 10 may provide information correlating to a particular output optical path to be used to reach the node or nodes corresponding to the identified address. For example, bypass module 182 of switch controller 106 may use a lookup table to correlate the identified address with an optical crosspoint switch of optical module 104.

In block 706, switch controller 106 activates the determined optical crosspoint switch to route optical signals received on the first input optical path out of the node via a corresponding output optical path connected to the optical crosspoint switch. In addition to enabling the optical path via the optical crosspoint switch, switch controller 106 may also deactivate or disable certain electrical components for an electrical path in node 100 to conserve power while the optical signals are routed out of node 100 without buffering data from the optical signals or converting the optical signals into electrical signals for processing data from the optical signals.

In the example of FIG. 4, bypass module 182 of switch controller 106 can control a switch module 164 to activate an optical crosspoint switch 158 via high speed silicon interposer 130B and a connection 176 in optical module 104. As discussed above, some implementations may only activate or energize particular resonators in the optical crosspoint switch 158 so as to selectively route optical signals of a particular channel or frequency of light.

In some implementations, an optical to electrical converter 153 on the input optical path may periodically convert an optical signal received on the input optical path into an electrical signal to snoop or observe whether the series of related optical signals has ended, or to determine if the signal strength or quality has fallen below a threshold for retiming, error correction, or converting the other optical signals into stronger or corrected optical signals for retransmission from node 100. In some cases, the first optical signal may provide an indication of how long the optical crosspoint switch should remain activated, which may be based on a size of the data transmitted by the optical signals. In other cases, an acknowledgement of completion may be sent from the target destination node on a separate optical path but routed through the same nodes (i.e., a return path) to quickly indicate optical crosspoint switches that may be deactivated. In yet other cases, an end command may be received during the periodic observation of the optical signals, which causes switch controller 106 to deactivate the optical crosspoint switch and enable or power on any electrical components that may have been powered off during the optical routing via the crosspoint switch.

Figure 8:
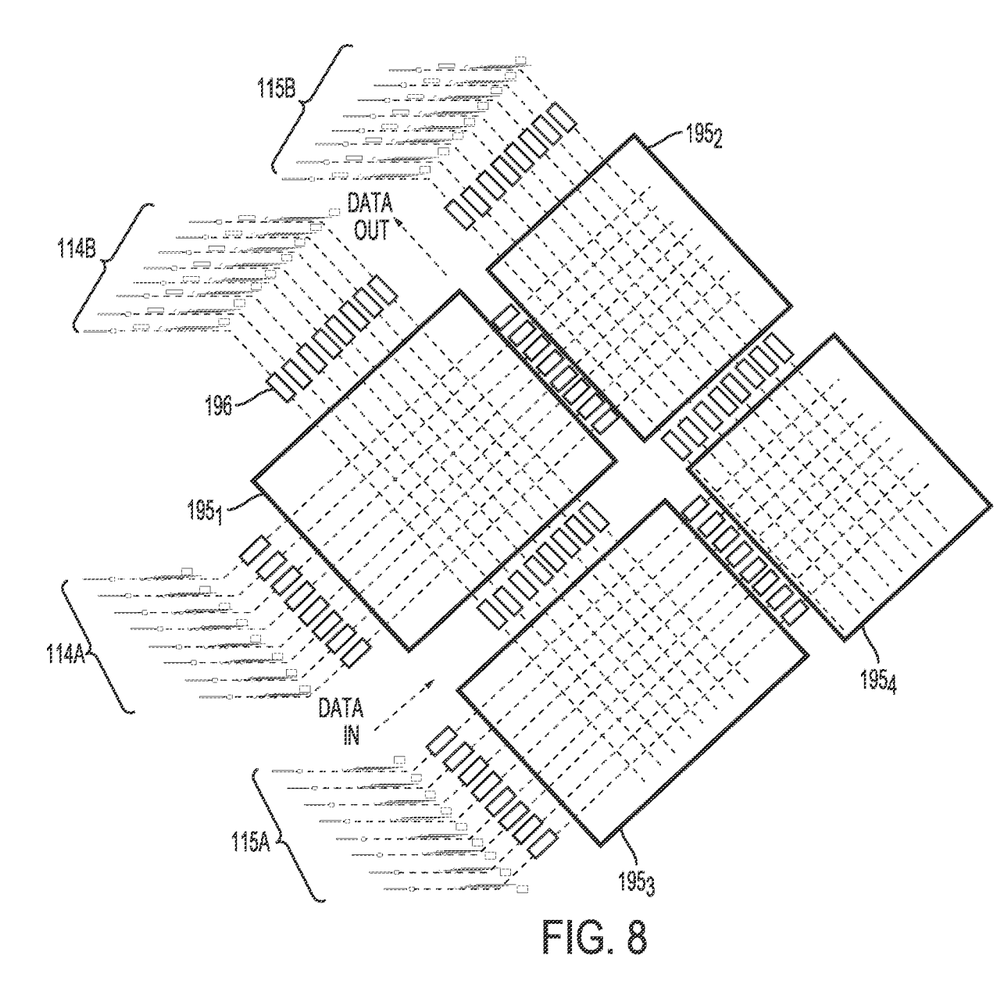
FIG. 8 depicts switch arrays of an optical module including optical amplifiers according to an embodiment.

FIG. 8 depicts switch arrays 195₁, 195₂, 195₃, and 195₄ of an optical module according to an embodiment. As shown in FIG. 8, each optical path includes an optical amplifier 196 to amplify optical signals, which may have lost some signal strength in traveling through components of the optical module, such as the waveguides of the optical paths, couplers, and optical crosspoint switches. Optical amplifiers 196 may include, for example, III-V semiconductor materials.

In the example of FIG. 8, each of input optical paths 114A and 115A connects with each of output optical paths 114B and 115B via a respective optical crosspoint switch at the intersection of the optical paths in one of switch arrays $195_1$, $195_2$, $195_3$, or $195_4$. As discussed in more detail in co-pending U.S. application Ser. No. 16/024,734, filed Jun. 29, 2018, and incorporated by reference above, and with reference the description of FIG. 7 above, certain groups of optical signals may be retimed or converted into optical signals with corrected data or improved signal strength. In such cases, an initial optical signal may be used to determine a signal strength or a number of previous nodes receiving the initial optical signal that can be used to determine whether subsequent optical signals will be retimed or converted by the node before transmission to a next node in the network.

As discussed above, the foregoing arrangements of a node device ordinarily improve the bandwidth and data transfer rates among components within the node, such as by using a parallel bus or parallel connections between a switch controller and other components in the node. Such connections, as with silicon bridges, may provide space savings in addition to using an MCM construction for the node.

In addition, the use of optical crosspoint switches can reduce the power consumption of nodes while increasing the speed at which data can be sent through a network of nodes by selectively routing optical signals through the node without incurring hop latency for buffering data from the optical signals or otherwise processing data from the optical signals routed by the node. Since optical signals can travel through a greater number of nodes for a given amount of latency, the routing of optical signals described above can ordinarily allow for more nodes in a network by making better use of a fewer number of optical connections between the nodes. The use of optical amplifiers and/or switch arrays as in FIGS. 6 and 8 described above can further improve the interconnectivity of optical nodes within a network.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or a controller to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or a controller, such as, for example, a CPU, an MPU, an MCU, or a DSP, and can include, for example, an FPGA, an ASIC, or other programmable logic device, discrete gate or transistor logic, discrete hardware components, or any combination thereof designed to perform the functions described herein. A processor or controller may also be implemented as a combination of computing devices, e.g., a combination of a DSP and an MPU, a plurality of MPUs, one or more MPUs in conjunction with a DSP core, or any other such configuration. In some implementations, the controller or processor may form at least part of an SoC.

The activities of a method or process described in connection with the examples disclosed herein may be embodied directly in hardware, in a software module executed by a processor or a controller, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or the controller can read information from, and write information to, the storage medium. In the alternative, the storage medium may be integral to the processor or the controller.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Multi-Chip Module (MCM), comprising:
a substrate;
a switch controller on the substrate; and
an optical module on the substrate, the optical module including:
at least one input optical path configured to receive optical signals from outside the MCM;
at least one output optical path configured to transmit optical signals from the MCM to outside the MCM;
at least one optical to electrical converter configured to convert optical signals received on the at least one input optical path into electrical signals to send to the switch controller; and
at least one optical crosspoint switch configured to:
receive an optical signal via an input optical path of the at least one input optical path; and
selectively route the received optical signal out of the MCM via an output optical path of the at least one output optical path without the MCM converting the received optical signal into an electrical signal for processing data from the received optical signal, and
wherein an optical crosspoint switch of the at least one optical crosspoint switch connects the input optical path and the output optical path, the optical crosspoint switch configured to selectively route optical signals received by the MCM on the input optical path out of the MCM via the output optical path without converting the selectively routed optical signals into electrical signals by an optical to electrical converter of the at least one optical to electrical converter.

2. The MCM of claim 1, further comprising:
at least one electrical to optical converter configured to convert electrical signals received from the switch controller into optical signals to transmit outside the MCM via the at least one output optical path;
an input Serializer/Deserializer (SerDes) interface connected to the at least one optical to electrical converter for the at least one input optical path;
an input parallel connection connecting the input SerDes interface to the switch controller;
an output SerDes interface connected to the at least one electrical to optical converter for the at least one output optical path; and
an output parallel connection connecting the switch controller to the output SerDes interface.

3. The MCM of claim 1, wherein the switch controller is configured to:
identify an address from an optical signal received by the optical module corresponding to one or more devices outside the MCM; and
determine whether to activate an optical crosspoint switch of the at least one optical crosspoint switch based on the identified address.

4. The MCM of claim 1, wherein the optical module further includes:
a plurality of input optical paths; and
a plurality of output optical paths,
wherein each input optical path of the plurality of input optical paths connects to at least two output optical paths of the plurality of output optical paths via respective optical crosspoint switches, and
wherein the respective optical crosspoint switches are configured to selectively route optical signals received by the MCM on the input optical path out of the MCM via a corresponding output optical path of the at least two output optical paths without the MCM converting the selectively routed optical signals into electrical signals for processing data from the selectively routed optical signals by the switch controller.

5. The MCM of claim 4, wherein the switch controller is configured to:
identify an address from an optical signal received on a first input optical path of the plurality of input optical paths, the address corresponding to one or more devices outside the MCM;
determine an optical crosspoint switch from among a plurality of optical crosspoint switches connected to the first input optical path to activate based on the identified address; and
activate the determined optical crosspoint switch to route optical signals received on the first input optical path out of the MCM via a corresponding output optical path connected to the determined optical crosspoint switch.

6. The MCM of claim 1, wherein the optical module further includes:
at least one electrical to optical converter configured to:
convert electrical signals received from the switch controller into optical signals to transmit outside the MCM via the at least one output optical path; and
multiplex multiple optical signals for simultaneous transmission on a single output optical path of the at least one output optical path.

7. A device, comprising:
a substrate;
a switch controller on the substrate;
an optical module on the substrate configured to communicate with at least one component outside of the device;
at least one memory on the substrate;
a parallel bus electrically connecting the at least one memory and the switch controller; and
at least one of a hardware accelerator, a processor, and a Field Programmable Gate Array (FPGA) on the substrate and electrically connected to the switch controller via the parallel bus.

8. The device of claim 7, wherein the optical module and the switch controller are electrically connected by at least one Serializer/Deserializer (SerDes) interface.

9. The device of claim 7, further comprising:
an input SerDes interface electrically connected to the optical module;
an input parallel connection electrically connecting the input SerDes interface to the switch controller;
an output SerDes interface electrically connected to the optical module; and
an output parallel connection electrically connecting the switch controller to the output SerDes interface.

10. The device of claim 7, wherein the optical module includes at least one optical crosspoint switch for selectively routing an optical signal received by the optical module out of the device without the device buffering data from the optical signal or without converting the received optical signal into an electrical signal for processing data from the optical signal by the switch controller.

11. The device of claim 7, wherein the optical module includes:
at least one input optical path configured to receive optical signals from outside the device;
at least one optical to electrical converter configured to convert optical signals received on the at least one input optical path into electrical signals to send to the switch controller;
at least one output optical path configured to transmit optical signals from the device to outside the device;
at least one electrical to optical converter configured to convert electrical signals received from the switch controller into optical signals to transmit outside the device via the at least one output optical path; and
at least one optical crosspoint switch connecting the at least one input optical path and the at least one output optical path, the at least one optical crosspoint switch configured to selectively route optical signals received by the device on the at least one input optical path out of the device via the at least one output optical path without the device converting the selectively routed optical signals into electrical signals for processing data from the selectively routed optical signals by the switch controller.

12. The device of claim 7, wherein the optical module includes:
a plurality of input optical paths; and
a plurality of output optical paths,
wherein each input optical path of the plurality of input optical paths connects to at least two output optical paths of the plurality of output optical paths via respective optical crosspoint switches, and
wherein the respective optical crosspoint switches are configured to selectively route optical signals received by the device on the input optical path out of the device via a corresponding output optical path of the at least two output optical paths without the device converting the selectively routed optical signals into electrical signals for processing data from the selectively routed optical signals by the switch controller.

13. The device of claim 12, wherein the switch controller is configured to:
identify an address from an optical signal received on a first input optical path of the plurality of input optical paths, the address corresponding to one or more nodes in a network connected to the optical module of the device;
determine an optical crosspoint switch from among a plurality of optical crosspoint switches connected to the first input optical path to activate based on the identified address; and
activate the determined optical crosspoint switch to route optical signals received on the first input optical path out of the device via a corresponding output optical path connected to the determined optical crosspoint switch.

14. A Multi-Chip Module (MCM), comprising:
a plurality of input optical paths for receiving optical signals from outside the MCM;
a plurality of output optical paths for transmitting optical signals to outside the MCM; and
a plurality of optical crosspoint switches, each optical crosspoint switch of the plurality of optical crosspoint switches connecting an input optical path of the plurality of input optical paths to an output optical path of the plurality of output optical paths;
wherein each input optical path of the plurality of input optical paths connects to at least two output optical paths of the plurality of output optical paths via respective optical crosspoint switches of the plurality of optical crosspoint switches; and
wherein the respective optical crosspoint switches are configured to selectively route optical signals received by the MCM on the input optical path out of the MCM via a corresponding output optical path of the at least two output optical paths without the device converting the selectively routed optical signals into electrical signals for processing data from the selectively routed optical signals by the switch controller.

15. The MCM of claim 14, wherein each input optical path of the plurality of input optical paths connects to each output optical path of the plurality of output optical paths via a respective optical crosspoint switch of the plurality of optical crosspoint switches.

16. The MCM of claim 14, wherein an input optical path of the plurality of input optical paths connects to a subset of the plurality of output optical paths via respective optical crosspoint switches of the plurality optical crosspoint switches.

17. The MCM of claim 14, further comprising a switch controller configured to:
identify an address from an optical signal received on a first input optical path of the plurality of input optical paths, the address corresponding to one or more nodes in a network connected to the MCM;
determine an optical crosspoint switch from among the plurality of optical crosspoint switches connected to the first input optical path to activate based on the identified address; and
activate the determined optical crosspoint switch to route optical signals received on the first input optical path out of the MCM via a corresponding output optical path connected to the determined optical crosspoint switch.

18. A Multi-Chip Module (MCM), comprising:
a substrate;
a switch controller on the substrate; and
an optical module on the substrate, the optical module including:
at least one input optical path configured to receive optical signals from outside the MCM;
at least one output optical path configured to transmit optical signals from the MCM to outside the MCM;
means for:
converting electrical signals received from the switch controller into optical signals to transmit outside the MCM via the at least one output optical path; and
multiplexing multiple optical signals for simultaneous transmission on a single output optical path of the at least one output optical path; and
at least one optical crosspoint switch configured to:
receive an optical signal via an input optical path of the at least one input optical path; and
selectively route the received optical signal out of the MCM via an output optical path of the at least one output optical path without the MCM converting the received optical signal into an electrical signal for processing data from the received optical signal.

19. A device, comprising:
a substrate;
a switch controller on the substrate;
an optical module on the substrate configured to communicate with at least one component outside of the device,
wherein the optical module includes at least one optical crosspoint switch for selectively routing an optical signal received by the optical module out of the device without the device buffering data from the optical signal or without converting the received optical signal into an electrical signal for processing data from the optical signal by the switch controller;
at least one memory on the substrate; and
a parallel bus electrically connecting the at least one memory and the switch controller.

20. The device of claim 19, wherein the optical module further includes:
a plurality of input optical paths; and
a plurality of output optical paths,
wherein each input optical path of the plurality of input optical paths connects to at least two output optical paths of the plurality of output optical paths via respective optical crosspoint switches, and
wherein the respective optical crosspoint switches are configured to selectively route optical signals received by the device on the input optical path out of the device via a corresponding output optical path of the at least two output optical paths without the device converting the selectively routed optical signals into electrical signals for processing data from the selectively routed optical signals by the switch controller.

* * * * *